No. 667,889. Patented Feb. 12, 1901.
S. B. MORSS.
ELECTRIC SPARK COIL.
(Application filed Mar. 21, 1900.)

(No Model.)

WITNESSES
C. W. Benjamin
F. E. Turner

INVENTOR
S. B. Morss
by T. F. Bourne
his ATTY

UNITED STATES PATENT OFFICE.

STEPHEN B. MORSS, OF RAHWAY, NEW JERSEY.

ELECTRIC SPARK-COIL.

SPECIFICATION forming part of Letters Patent No. 667,889, dated February 12, 1901.

Application filed March 21, 1900. Serial No. 9,511. (No model.)

*To all whom it may concern:*

Be it known that I, STEPHEN B. MORSS, a citizen of the United States, residing at Rahway, Union county, State of New Jersey, have invented certain new and useful Improvements in Electric Spark-Coils, of which the following is a specification.

The object of my invention is to provide an electric coil adapted to receive a battery, whereby a spark-coil can be produced which shall be light and convenient to handle, effective in use, simple in construction, and cheap to manufacture; and the invention consists in the novel details of improvement, that will be more fully hereinafter set forth and then pointed out in the claims.

Reference is to be had to the accompanying drawings, in which similar letters of reference indicate corresponding parts in the views, and wherein—

Figure 1:
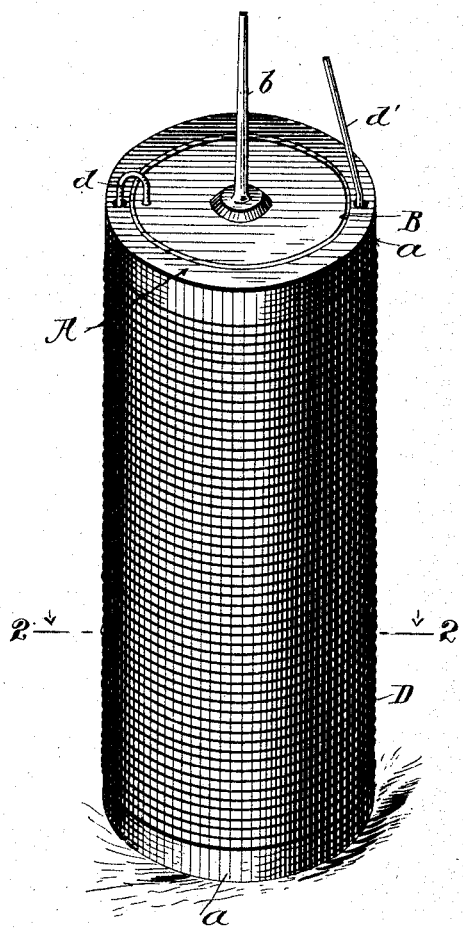
Figure 2:
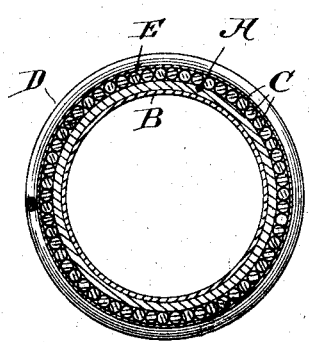

Figure 1 is a perspective view of a spark-coil embodying my invention, and Fig. 2 is a cross-section on the line 2 2 in Fig. 1.

In the accompanying drawings the letter A indicates a hollow core or receptacle, preferably of insulating material, adapted to contain a battery B. The latter may be a dry battery or it may be a suitable jar or the like adapted to contain the chemicals of a fluid-battery. Upon the exterior of core A I place magnetizable metal, which I have shown in the form of rods or wires C, extending longitudinally of said core and in contact with each other, which rods are retained between flanges $a$ of said core. Instead of using longitudinal soft-iron rods or wires I may use other corresponding material made in any suitable form, such as a cylinder or a series of rings encircling the core and in contact with each other. Thus the core A serves the double purpose of inclosing the battery and of sustaining the magnetizable metal C; but it will be evident that the latter could be mounted directly upon the battery without the use of the interposed core, particularly when a dry battery is used. The core A may also serve as an insulating medium between the battery and the field C. Around the material C is wound a coil of insulated wire D, and preferably between the parts C and D, I interpose an insulating medium E, such as paraffin-paper or the like, to prevent short-circuiting of the winding D should its insulation become ruptured. One terminal $d$ of coil D is connected with a terminal of battery B, and the other terminal $d'$ of said coil is adapted to be brought into circuit with a terminal $b$ of the battery by any suitable or well-known means that will produce a spark upon the breaking of the circuit. The current from battery B flows through the coil D and causes magnetization to take place in the metal C, and a current is established sufficient to produce a spark at the terminals connected with $d'$ and $b$ capable of lighting gas or the like.

Where a fluid-battery is used, one end of core A can be wholly or partially closed to retain the battery therein, and the opposite end of the battery may be provided with a cover to keep the chemicals from spilling, as indicated in Fig. 1. When a dry battery is used, it will be apparent that the spark-coil can be conveniently handled and that the battery and coil are always in operative relation and not liable to become disconnected. Any suitable means may be provided for firmly holding the battery in place.

By having the battery B within the magnet-field or the core A a spark-coil may be made of relatively simple and compact form, while the exterior core and winding protect the battery, and the device can be conveniently handled and at the same time is simple in construction, cheap to manufacture, and not liable to get out of order.

Having now described my invention, what I claim is—

1. As an article of manufacture, a hollow core or receptacle, a metallic field surrounding the same, a coil or winding surrounding said field, and a battery adapted to be contained within said core and connected with one of the terminals of said coil or winding, substantially as described.

2. The combination of a hollow core or receptacle, a plurality of longitudinally-disposed wires or rods surrounding the same, a coil or winding surrounding said wires or rods, and a battery located in said core, one of the terminals of the battery being connected with said coil or winding, substantially as described.

3. The combination of a hollow core having end flanges, a plurality of longitudinally-disposed wires or rods surrounding the same, a coil or winding surrounding said wires or rods, and a battery located within said core and having a terminal connected with said coil or winding, substantially as described.

STEPHEN B. MORSS.

Witnesses:
T. F. BOURNE,
F. E. TURNER.